United States Patent
Noguchi et al.

(10) Patent No.: US 9,083,272 B2
(45) Date of Patent: Jul. 14, 2015

(54) MOTOR CONTROL CIRCUIT, MOTOR CONTROL SYSTEM AND MOTOR CONTROL METHOD

(75) Inventors: Fumio Noguchi, Kanagawa-ken (JP); Yoshihito Nakamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 480 days.

(21) Appl. No.: 13/420,564

(22) Filed: Mar. 14, 2012

(65) Prior Publication Data
US 2013/0076281 A1 Mar. 28, 2013

(30) Foreign Application Priority Data
Sep. 22, 2011 (JP) .................................. 2011-207591

(51) Int. Cl.
*H02P 6/16* (2006.01)
*H02K 29/06* (2006.01)
*H02P 6/10* (2006.01)
*H02P 6/12* (2006.01)

(52) U.S. Cl.
CPC .. *H02P 6/16* (2013.01); *H02P 6/10* (2013.01); *H02P 6/12* (2013.01)

(58) Field of Classification Search
CPC ............. H02P 6/06; H02P 6/182; H02P 6/16; H02P 6/14; H02P 6/08
USPC .................................................... 318/400.04
See application file for complete search history.

(56) References Cited

U.S. PATENT DOCUMENTS

| 5,999,431 A * | 12/1999 | Sugiyama ........................ 363/95 |
| 2005/0162107 A1 | 7/2005 | Murakami |
| 2009/0009116 A1* | 1/2009 | Kakimoto et al. ........ 318/400.34 |
| 2009/0056385 A1* | 3/2009 | Maekawa ..................... 68/12.16 |
| 2009/0240389 A1* | 9/2009 | Nomura et al. .................. 701/29 |

FOREIGN PATENT DOCUMENTS

JP 2006-115648 4/2006

OTHER PUBLICATIONS

Chinese Patent Office, Office Action in Patent Application No. 201210065677.4, dated Jul. 28, 2014.

* cited by examiner

*Primary Examiner* — Eduardo Colon Santana
*Assistant Examiner* — Gabriel Agared
(74) *Attorney, Agent, or Firm* — Patterson & Sheridan LLP

(57) ABSTRACT

According to an embodiment, a motor control circuit includes a rotational position decoding unit, a rotational position determining unit, and a motor drive signal generating unit. The rotational position decoding unit is configured to generate a rotational position signal representing a rotational position of a motor according to a sensor signal provided by a sensor. The rotational position determining unit is configured to store a current rotational position of the motor based on the rotational position signal. When the rotational position signal represents a subsequent rotational position of the stored current rotational position, the rotational position determining unit is configured to update the stored current rotational position with the subsequent rotational position, and generate a motor control signal representing the subsequent rotational position. The motor drive signal generating unit is configured to generate a motor drive signal for driving the motor according to the motor control signal.

12 Claims, 15 Drawing Sheets

MOTOR CONTROL CIRCUIT, MOTOR CONTROL SYSTEM AND MOTOR CONTROL METHOD

CROSS REFERENCE TO RELATED APPLICATION

This application is based upon and claims the benefit of priority from the prior Japanese Patent Application No. 2011-207591 filed on Sep. 22, 2011 in Japan, the entire contents of which are incorporated herein by reference.

FIELD

Embodiments described herein relate generally to a motor control circuit, a motor control system and a motor control method.

BACKGROUND

A motor control system for controlling a brushless motor controls the motor according to a rotational position of the motor detected by a sensor. A sensor signal output from the sensor contains noise or chattering, and therefore, a filter is used to remove the chattering and the noise. A rotational position signal representing the rotational position of the motor is generated according to the output signal of the filter, and a motor drive signal for driving the motor is generated based on this rotational position signal.

As described above, since the filter is used, the rotational position signal is delayed from a time at which the rotational position signal should be generated. For this reason, signal processing for generating the motor drive signal starts with the delay.

However, when a large noise occurs that cannot be removed by the filter, this noise is included in the motor drive signal. This may cause an abnormal current to flow through the motor and may cause the motor to abnormally rotate, thereby disturbing smooth rotation of the motor.

On the other hand, when a filter capable of removing a large noise is used, the delay of the rotational position signal further increases, which makes it difficult to perform the signal processing according to the rotation of the motor. In particular, when the rotational speed of the motor is high, the signal processing fails to catch up, and this may disturb smooth rotation of the motor.

DETAILED DESCRIPTION

According to an embodiment, a motor control circuit includes a rotational position decoding unit, a rotational position determining unit, and a motor drive signal generating unit. The motor control circuit is configured to control a motor according to a rotational position of the motor detected by a sensor. The rotational position decoding unit is configured to generate a rotational position signal representing the rotational position of the motor according to a sensor signal provided by the sensor. The rotational position determining unit is configured to store a current rotational position of the motor based on the rotational position signal. When the rotational position signal represents a subsequent rotational position of the stored current rotational position, the rotational position determining unit is configured to update the stored current rotational position with the subsequent rotational position, and generate a motor control signal representing the subsequent rotational position. The motor drive signal generating unit is configured to generate a motor drive signal for driving the motor according to the motor control signal.

Embodiments of the present invention will be hereinafter explained with reference to drawings. It is to be understood that the present invention is not limited by these embodiments.

First Embodiment

Figure 1:
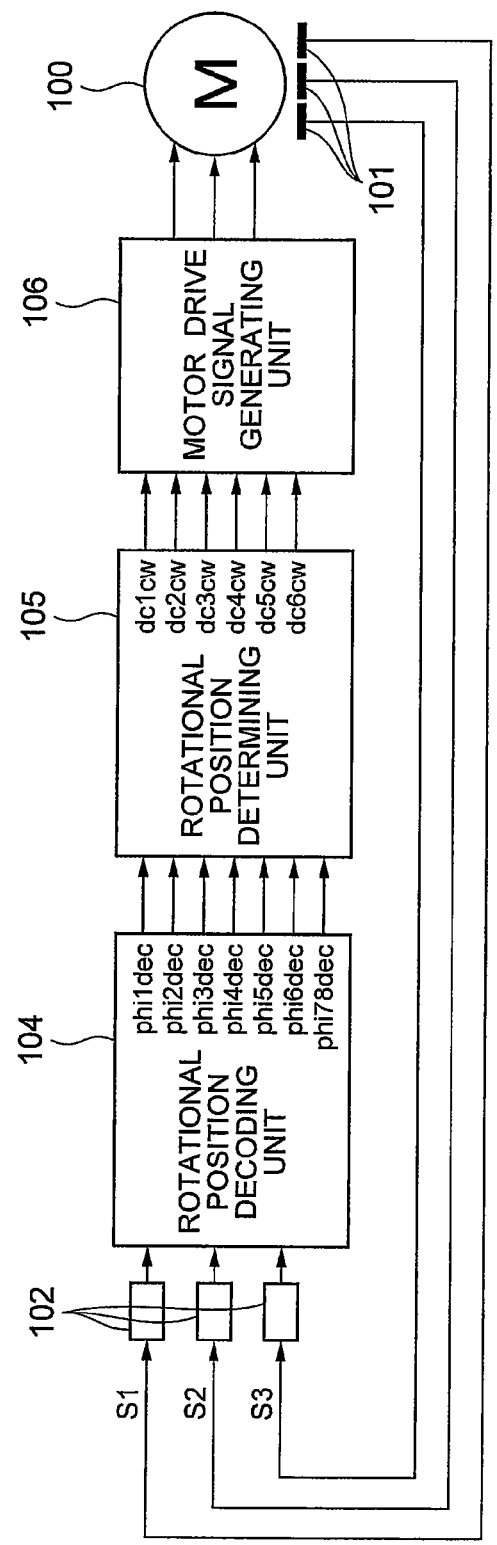
FIG. 1 is a block diagram schematically illustrating a configuration of a motor control system according to a first embodiment.

FIG. 1 is a block diagram schematically illustrating a configuration of a motor control system according to the first embodiment. As shown in FIG. 1, the motor control system includes a motor 100, three sensors 101, three sensor signal input terminals 102, a rotational position decoding unit 104, a rotational position determining unit 105, and a motor drive signal generating unit 106. The rotational position decoding unit 104, the rotational position determining unit 105, and the motor drive signal generating unit 106 function as a motor control circuit.

The motor 100 is a three-phase brushless motor, and rotates and operates according to a three-phase motor drive signal supplied from the motor drive signal generating unit 106.

The three sensors 101 detect rotational position of the motor 100, i.e., relative position of the rotor and the windings of the motor 100. The sensors 101 are magnetic sensors such as hall sensors, and are arranged with a regular interval around the rotor. Each sensor 101 generates corresponding first to third sensor signals S1 to S3 according to rotational positions of the motor 100, and supplies corresponding first to third sensor signals S1 to S3 to corresponding sensor signal input terminals 102.

With the configuration explained below, the motor control circuit controls the motor 100 according to the rotational position of the motor 100 detected by the sensors 101.

The rotational position decoding unit 104 decodes the three sensor signals, i.e., the first to third sensor signals S1 to S3, which are supplied from the sensors 101 via the sensor signal input terminals 102, and generates first to seventh rotational position signals (decoded signals) phi1dec to phi6dec, phi78dec representing rotational positions of the motor 100. More specifically, one of the seven rotational position signals, i.e., the first to seventh rotational position signals phi1dec to phi6dec, phi78dec attains high level (enabled) (hereinafter referred to as "H"). Each of the six rotational position signals, i.e., the first to sixth rotational position signals phi1dec to phi6dec, is changed to "H" according to the rotational position of the motor 100. Therefore, it is possible to identify the rotational position of the motor 100 based on which of the six rotational position signals, i.e., the first to sixth rotational position signals phi1dec to phi6dec, is at "H" level.

When the combination of the first to third sensor signals S1 to S3 is what never happens during normal rotation, i.e., when the first to third sensor signals S1 to S3 are abnormal, the rotational position decoding unit 104 generates first to seventh rotational position signals phi1dec to phi6dec, phi78dec representing abnormal state. More specifically, only the seventh rotational position signal phi78dec attains "H" level.

The rotational position determining unit 105 stores the current rotational position of the motor 100 based on the received first to seventh rotational position signals phi1dec to phi6dec, phi78dec. Then, when the first to seventh rotational position signals phi1dec to phi6dec, phi78dec indicate a rotational position subsequent to the stored current rotational position, the rotational position determining unit 105 updates the stored current rotational position with the subsequent rotational position, and generates first to sixth motor control signals dc1cw to dc6cw representing the subsequent rotational position.

More specifically, the rotational position determining unit 105 determines, based on the first to seventh rotational position signals phi1dec to phi6dec, phi78dec, whether the rotational position of the motor 100 is in a correct rotational order and at a correct rotational position, and only when the rotational position of the motor 100 is at the correct rotational position, the rotational position determining unit 105 changes, to "H" level, the motor control signal corresponding to the correct rotational position among the six motor control signals, i.e., the first to sixth motor control signals dc1cw to dc6cw. The rotational position of the motor 100 can be identified based on which of the first to sixth motor control signals dc1cw to dc6cw is at "H" level. In the present embodiment, the rotational position can be identified at every 60 degrees.

The motor drive signal generating unit 106 generates a three-phase motor drive signal for driving the motor 100 according to the first to sixth motor control signals dc1cw to dc6cw. The motor drive signal generating unit 106 includes a plurality of switching devices such as transistors, and the motor drive signals are output from these switching devices. The motor drive signal is, for example, a PWM signal.

Figure 2:
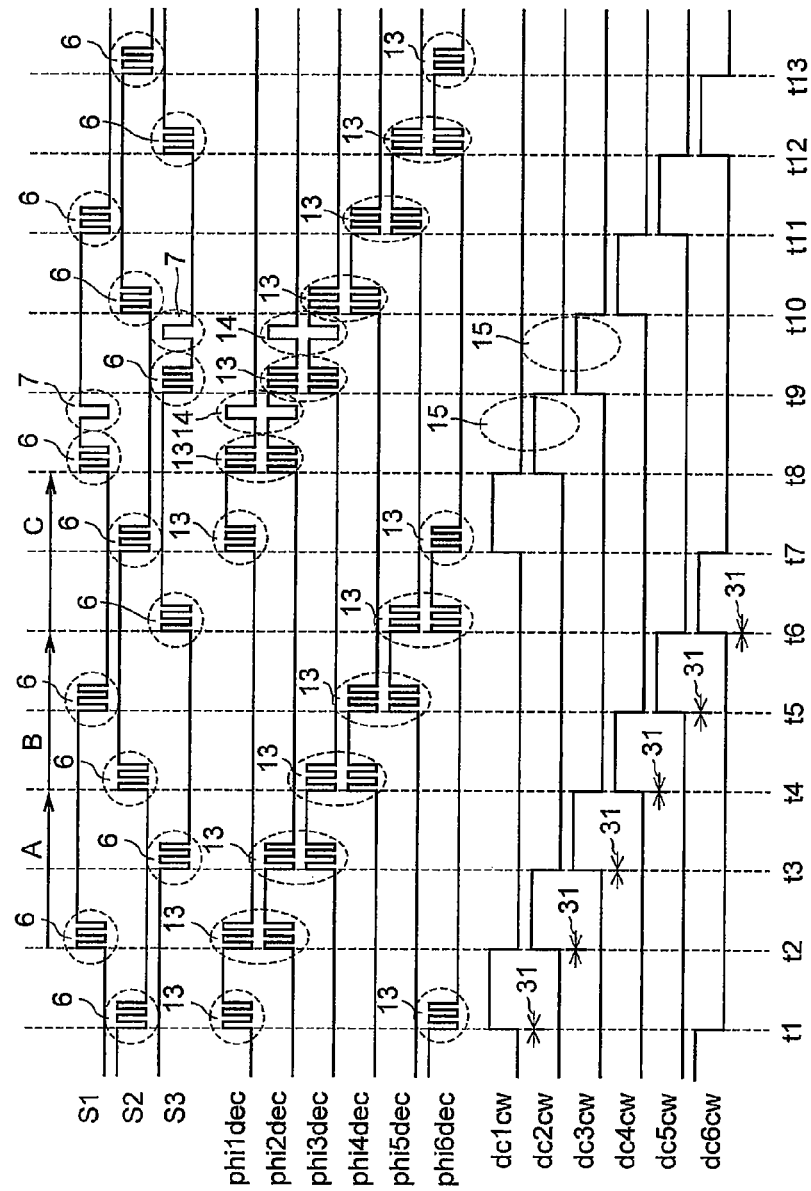
FIG. 2 is a waveform chart illustrating signals of the motor control system according to the first embodiment.

FIG. 2 is a waveform chart illustrating signals of a motor control system according to the first embodiment. FIG. 2 shows the three sensor signals, i.e., first to third sensor signals S1 to S3, the six rotational position signals, i.e., first to sixth rotational position signals phi1dec to phi6dec, and the six motor control signals, i.e., first to sixth motor control signals dc1cw to dc6cw.

The first to third sensor signals S1 to S3 include chattering 6 which occurs when changing from the high level to a low level (disabled) (hereinafter referred to as "L") or from "L" level to "H" level. The chattering 6 includes small pulses. When an ideal case where there is no chattering 6 is considered in the example of FIG. 2, the first sensor signal S1 changes from "L" level to "H" level at a time t2, and changes to "L" level at a time t5. The second sensor signal S2 changes from "L" level to "H" level at a time t4, and changes to "L" level at a time t7. The third sensor signal S3 changes from "L" level to "H" level at a time t6, and changes to "L" level at a time t9. As described above, the phases of the first to third sensor signals S1 to S3 are shifted 120 degrees from each other. More specifically, the phases are respectively shifted 120 degrees from the times t2 to t4 (arrow A), from the times t4 to t6 (arrow B), and from the times t6 to t8 (arrow C). In other words, for example, the phases are shifted 360 degrees from the times t2 to t8 (the motor 100 rotates 360 degrees).

The first and third sensor signals S1, S3 include a noise 7.

In the case of the three-phase motor, it is necessary to obtain the rotational position at every 60 degrees. For this reason, as described above, based on the first to third sensor signals S1 to S3, the rotational position decoding unit 104 generates the first to sixth rotational position signals phi1dec to phi6dec, only one of which is enabled ("H") at every one-sixth angle of rotational position (60 degrees) of the motor 100. In the example as shown in the figure, when the first to third sensor signals S1, S2, S3 attain "L, L, H" in this order, the first rotational position signals phi1dec attains "H" level. Likewise, when the first to third sensor signals S1, S2, S3 attain "H, L, H" in this order, the second rotational position signal phi1dec attains "H" level. When the first to third sensor signals S1, S2, S3 attain "H, L, L" in this order, the third rotational position signal phi3dec attains "H" level. When the first to third sensor signals S1, S2, S3 attain "H, H, L" in this order, the fourth rotational position signal phi4dec attains "H" level. When the first to third sensor signals S1, S2, S3 attain "L, H, L" in this order, the fifth rotational position signal phi1dec attains "H" level. When the first to third sensor signals S1, S2, S3 attain "L, H, H" in this order, the sixth rotational position signal phi6dec attains "H" level. As explained later, when all the first to third sensor signals S1 to S3 are "H" or "L" level, the seventh rotational position signal phi78dec attains "H" level. Since the chattering 6 and the noise 7 are transmitted, the first to sixth rotational position signals phi1dec to phi6dec involve signals which are not preferable to the control of the motor such as the chattering 13 and the noise 14.

As described above, the rotational position determining unit 105 stores the current rotational position, and when the rotational position signal representing the subsequent rotational position of the current rotational position is enabled, the rotational position determining unit 105 immediately updates the stored rotational position, and generates first to sixth motor control signals dc1cw to dc6cw corresponding to the subsequent rotational position. In this manner, for example, at the time t1 at which the first rotational position signals phi1dec attains "H" level, the sixth motor control signal dc6cw attains "L" level and the first motor control signal dc1cw attains "H" level, and at the time t2 at which the second rotational position signal phi2dec attains "H" level, the first motor control signal dc1cw attains "L" level, and the second motor control signal dc2cw attains "H" level. Operations subsequent thereto are the same. That is, without being affected by the chattering, the first to sixth motor control signals dc1cw to dc6cw can be generated with ideal timing.

It should be noted that, as explained below, the transitions of the first to sixth motor control signals dc1cw to dc6cw involve a delay 31, but this delay 31 is too small to be shown in the temporal axis of FIG. 2.

As explained below, when a rotational position signal representing a rotational position other than the subsequent rotational position is enabled when the current rotational position is not stored at the start-up or re-start of the motor 100 or due to a reason other than the noise 7 (for example, displacement of the rotational position), the rotational position determining unit 105 does not immediately update the stored rotational position. When the rotational position signal continues to be enabled for a time equal to or more than a setting time set so as to prevent erroneous operation due to the noise 7, the rotational position determining unit 105 updates the stored rotational position.

An example of configuration and operation of the rotational position determining unit 105 will be hereinafter explained in detail.

Figure 3:
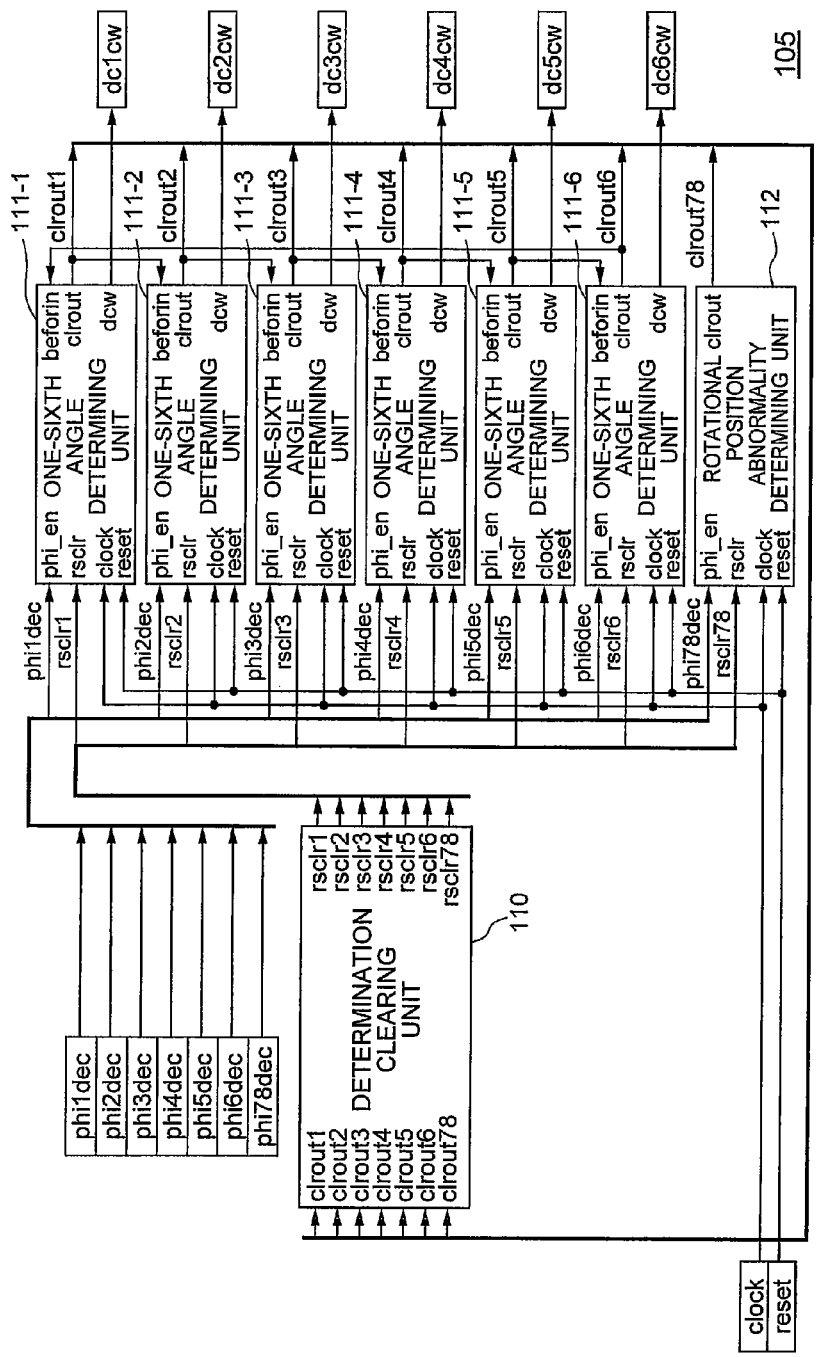
FIG. 3 is a block diagram illustrating a configuration of a rotational position determining unit according to the first embodiment.

FIG. 3 is a block diagram illustrating a configuration of the rotational position determining unit 105 according to the first embodiment. As shown in FIG. 3, the rotational position determining unit 105 includes a determination clearing unit 110, six first to sixth one-sixth angle determining units 111-1 to 111-6, and a rotational position abnormality determining unit 112.

When a signal phi_en attains "H" level when a signal beforin is at "H" level, each of the first to sixth one-sixth angle determining units 111-1 to 111-6 changes signals clrout and signals dcw to "H" level. After this, the following variables are stored: the signal clrout="H" and signal dcw="H". Thereafter, when signal rsclr attains "H" level, signal clrout is at "L" level and signal dcw is at "L" level. Other than the above, signal clrout is at "L" level and signal dcw is at "L" level.

The first one-sixth angle determining unit 111-1 receives the first rotational position signals phi1dec as the signal phi_en, receives the first rotational position clearing signal rsclr1 as the signal rsclr, receives the sixth clearing signal clrout6 as the signal beforin, outputs the signal clrout as the first clearing signal clrout1, and outputs the signal dcw as the first motor control signal dc1cw.

The second one-sixth angle determining unit 111-2 receives the second rotational position signal phi2dec as the signal phi_en, receives the second rotational position clearing signal rsclr2 as the signal rsclr, receives the first clearing signal clrout1 as the signal beforin, outputs the signal clrout as the second clearing signal clrout2, and outputs the signal dcw as the second motor control signal dc2cw.

The third one-sixth angle determining unit 111-3 receives the third rotational position signal phi3dec as the signal phi_en, receives the third rotational position clearing signal rsclr3 as the signal rsclr, receives the second clearing signal clrout2 as the signal beforin, outputs the signal clrout as the third clearing signal clrout3, and outputs the signal dcw as the third motor control signal dc3cw.

The fourth one-sixth angle determining unit 111-4 receives the fourth rotational position signal phi4dec as the signal phi_en, receives the fourth rotational position clearing signal rsclr4 as the signal rsclr, receives the third clearing signal clrout3 as the signal beforin, outputs the signal clrout as the fourth clearing signal clrout4, and outputs the signal dcw as the fourth motor control signal dc4cw.

The fifth one-sixth angle determining unit 111-5 receives the fifth rotational position signal phi5dec as the signal phi_en, receives the fifth rotational position clearing signal rsclr5 as the signal rsclr, receives the fourth clearing signal clrout4 as the signal beforin, outputs the signal clrout as the fifth clearing signal clrout5, and outputs the signal dcw as the fifth motor control signal dc5cw.

The sixth one-sixth angle determining unit 111-6 receives the sixth rotational position signal phi6dec as the signal phi_en, receives the sixth rotational position clearing signal rsclr6 as the signal rsclr, receives the fifth clearing signal clrout5 as the signal beforin, outputs the signal clrout as the sixth clearing signal clrout6, and outputs the signal dcw as the sixth motor control signal dc6cw.

As described above, the first to sixth one-sixth angle determining units 111-1 to 111-6 are connected in a ring shape.

The determination clearing unit 110 generates the first to seventh rotational position clearing signals rsclr1 to rsclr6, rsclr78 based on the first to seventh clearing signals clrout1 to clrout6, clrout78 from the first to sixth one-sixth angle determining units 111-1 to 111-6 and the rotational position abnormality determining unit 112, and outputs them to the first to sixth one-sixth angle determining units 111-1 to 111-6 and the rotational position abnormality determining unit 112. More specifically, when one of the first to sixth clearing signals clrout1 to clrout6 attains "H" level, the determination clearing unit 110 changes a corresponding rotational position clearing signal to "L" level and changes the other rotational position clearing signals to "H" level. That is, for example, when the first clearing signal clrout1 is at "H" level, the corresponding first rotational position clearing signal rsclr1 is changed to "L" level and the other second to seventh rotational position clearing signals rsclr1 to rsclr6, rsclr78 are changed to "H" level, so that the second to sixth one-sixth angle determining units 111-2 to 111-6 and the rotational position abnormality determining units 112 are cleared. When the seventh clearing signal clrout78 attains "H" level, the determination clearing unit 110 changes the corresponding seventh rotational position clearing signal rsclr78 to "L" level, and changes the other first to sixth rotational position clearing signals rsclr1 to rsclr6 to "H" level, so that the first to sixth one-sixth angle determining units 111-1 to 111-6 are cleared.

The rotational position abnormality determining unit 112 determines whether the first to seventh rotational position signals phi1dec to phi6dec, phi78dec are in abnormal state continuously for a predetermined period of time. More specifically, when signal phi_en continues to be "H" (seventh rotational position signal phi78dec="H") for the predetermined period of time, the rotational position abnormality determining unit 112 determines that this is abnormal, and changes the signal clrout (i.e., seventh clearing signal clrout 78) to "H" level. After this, signal clrout="H" is stored. Thereafter, when the signal rsclr attains "H" level (i.e., seventh rotational position clearing signal rsclr78="H"), the signal clrout attains "L" level.

Figure 4:
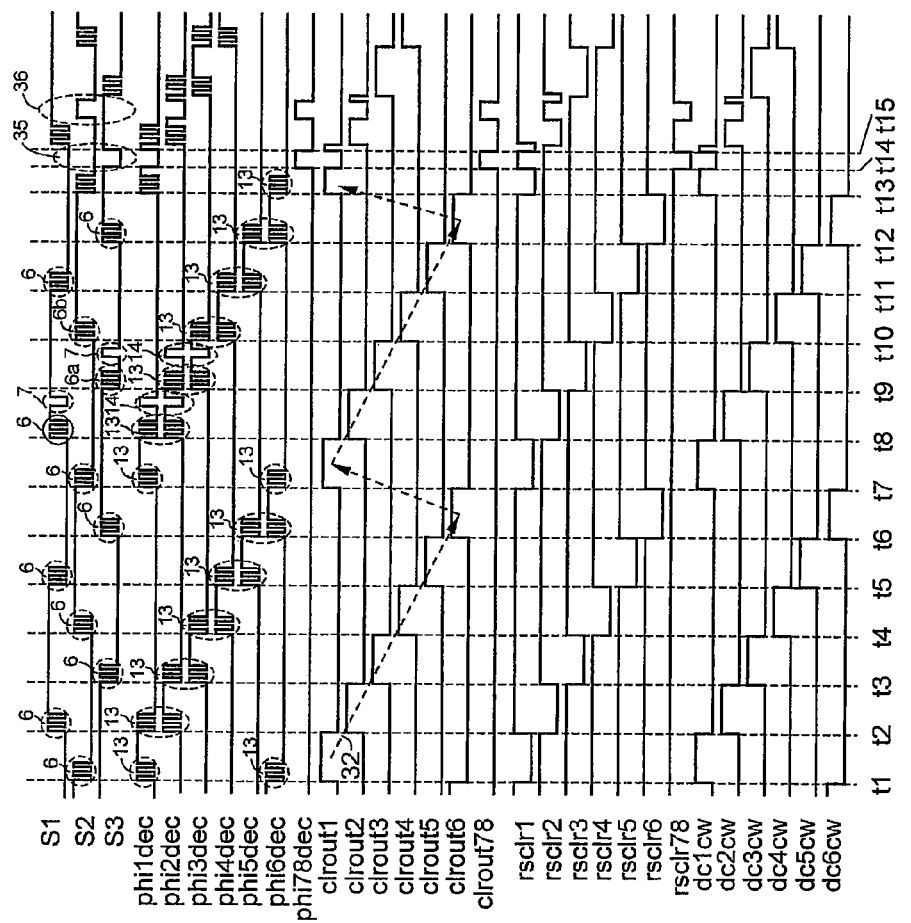
FIG. 4 is a waveform chart illustrating signals of the rotational position determining unit according to the first embodiment.

FIG. 4 is a waveform chart illustrating signals of the rotational position determining unit 105 according to the first embodiment. FIG. 4 is a waveform chart made by adding the seventh rotational position signal phi78dec, the first to seventh clearing signals clrout1 to clrout6, clrout78 and the first to seventh rotational position clearing signals rsclr1 to rsclr6, rsclr78 to the waveform chart of FIG. 2, and also added the waveform subsequent to the time t13. After the time t13, the first to third sensor signals S1 to S3 involve a state 35 in which all are "L" level and a state 36 in which all are "H" level, which can never happen during normal rotation.

In the rotational position determining unit 105, during rotation of the motor, the control proceeds in the direction from the first one-sixth angle determining unit 111-1 to the sixth one-sixth angle determining unit 111-6 for every one-sixth angle of rotational position (60 degrees). In other words, the first to sixth clearing signals clrout1 to clrout6 are changed to "H" level in order as shown by arrow 32 in FIG. 4. After the control proceeds to the sixth one-sixth angle determining unit 111-6, the control subsequently proceeds to the first one-sixth angle determining unit 111-1 in a ring form. The first to sixth one-sixth angle determining units 111-1 to 111-6 are cleared in an exclusive manner according to the first to seventh rotational position clearing signals rsclr1 to rsclr6, rsclr78 from the determination clearing unit 110, and only one of the first to sixth clearing signals clrout1 to clrout6 attains "H" level. The control proceeds when satisfying signal phi_en="H" and signal clrout="H" given from the one-sixth angle determining unit before the control proceeds. As explained later, even when clrout given from the one-sixth angle determining unit before the control proceeds is at "L" level, the one-sixth angle determining unit is enabled as long as phi_en is at "H" level for the predetermined setting time.

Figure 5:
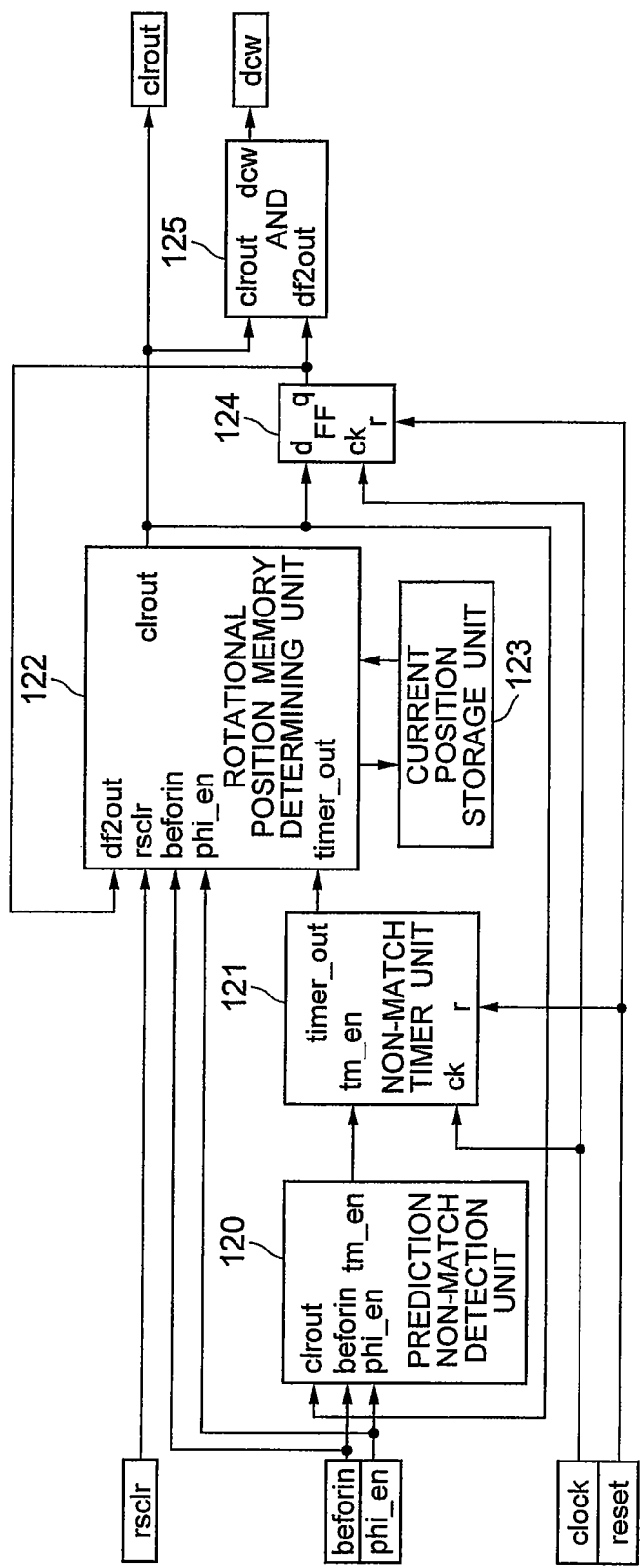
FIG. 5 is a block diagram illustrating a configuration of a first one-sixth angle determining unit according to the first embodiment.

FIG. 5 is a block diagram illustrating a configuration of the first one-sixth angle determining unit 111-1 according to the first embodiment. The first to sixth one-sixth angle determining units 111-1 to 111-6 have the same configuration. Therefore, only the first one-sixth angle determining unit 111-1 will be explained here. As shown in FIG. 5, the first one-sixth angle determining unit 111-1 includes a first prediction non-match detection unit 120, a first non-match timer unit 121, a first rotational position memory determining unit 122, a first current position storage unit 123, a D flip-flop 124, and an AND circuit 125.

The first prediction non-match detection unit 120 is configured such that only when the signal of its own (first clearing signal) clrout is at "L" level and the signal (sixth clearing signal) beforin is at "L" level (i.e., signal clrout of the one-sixth angle determining unit before the control proceeds is at "L" level) and the signal (first rotational position signal) phi_en is at "H" level, the first timer enable signal tm_en attains "H" level, and this starts the timer of the first non-match timer unit 121. In the other cases, the first timer enable signal tm_en attains "L" level.

Only when first timer enable signal tm_en is at "H" level, the first non-match timer unit 121 increases the count value, and when the count value reaches a setting value (when the setting time is measured), the first non-match timer unit 121 sets first timer output signal timer_out "H". When first timer enable signal tm_en is at "L" level, the counter value is cleared.

The first rotational position memory determining unit 122 outputs signal (first clearing signal) clrout "H" when first timer output signal timer_out is at "H" level or when signal beforin is at "H" level and signal phi_en is at "H" level. Alternatively, when signal df2out is at "H" level and signal rsclr is at "H" level, the first rotational position memory determining unit 122 outputs signal clrout "L". In the other cases, the signal clrout is maintained.

The first current position storage unit 123 stores the signal clrout.

The D flip-flop 124 receives a signal clrout from the input terminal d, receives a clock signal clock from the clock terminal ck, and outputs a signal df2out from the output terminal q. The AND circuit 125 outputs logical multiplication of the signal clrout and the signal df2out as the signal dcw.

Figure 6:
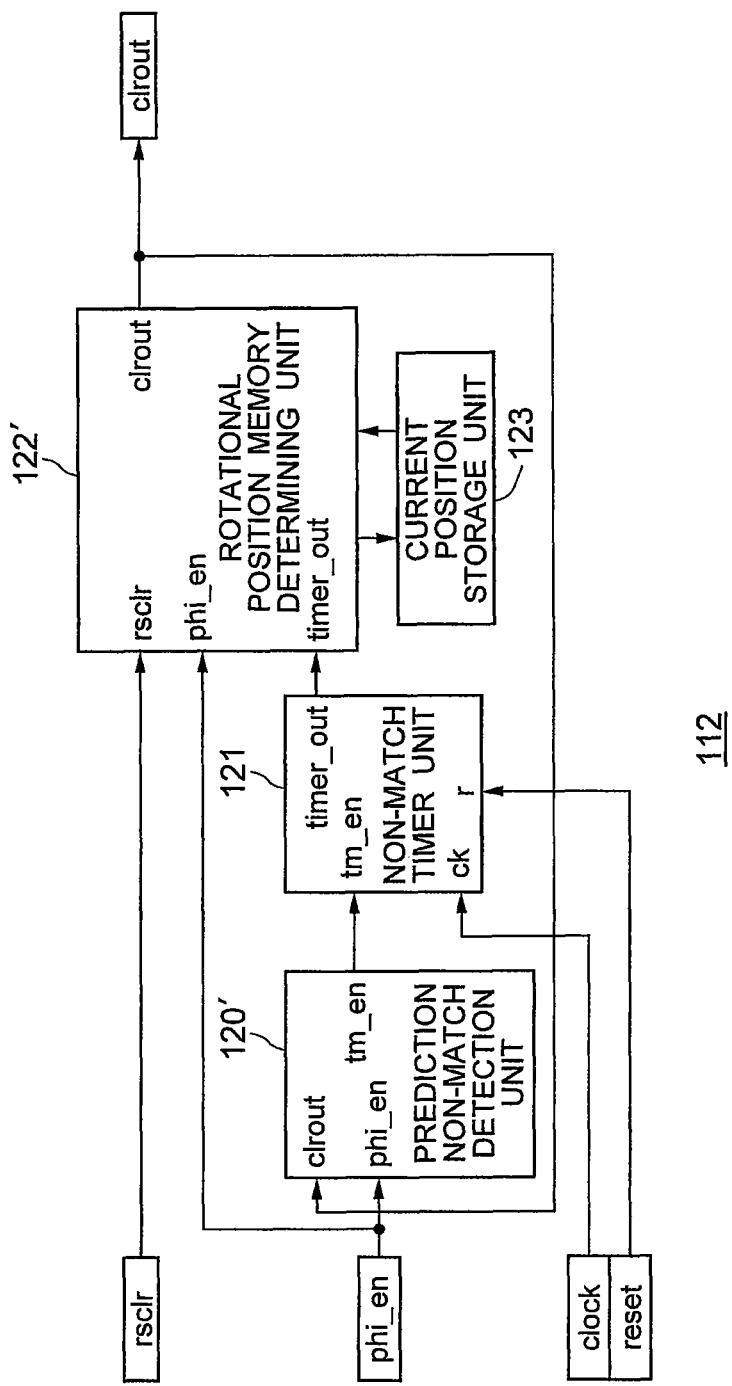
FIG. 6 is a block diagram illustrating a configuration of a rotational position abnormality determining unit according to the first embodiment.

FIG. 6 is a block diagram illustrating a configuration of the rotational position abnormality determining unit 112 according to the first embodiment. As shown in FIG. 6, the rotational position abnormality determining unit 112 includes a seventh prediction non-match detection unit 120', a seventh non-match timer unit 121, a seventh rotational position memory determining unit 122', and a seventh current position storage unit 123. The seventh non-match timer unit 121 and the seventh current position storage unit 123 are the same as those of the first one-sixth angle determining unit 111-1.

The seventh prediction non-match detection unit 120' is configured such that only when the signal of its own (seventh clearing signal) clrout is at "L" level and the signal (seventh rotational position signal) phi_en is at "H" level, the seventh timer enable signal tm_en attains "H" level, and this starts the timer of the seventh non-match timer unit 121. In the other cases, the seventh timer enable signal tm_en attains "L" level.

When the seventh non-match timer unit 121 counts the value up to the setting value, the seventh rotational position memory determining unit 122' outputs signal (seventh clearing signal) clrout="H". More specifically, the seventh rotational position memory determining unit 122' outputs signal clrout="H" when seventh timer output signal timer_out is at "H" level. The signal clrout "H" is stored in the seventh current position storage unit 123.

Subsequently, operation for removing the chattering will be explained in detail.

Figure 7:
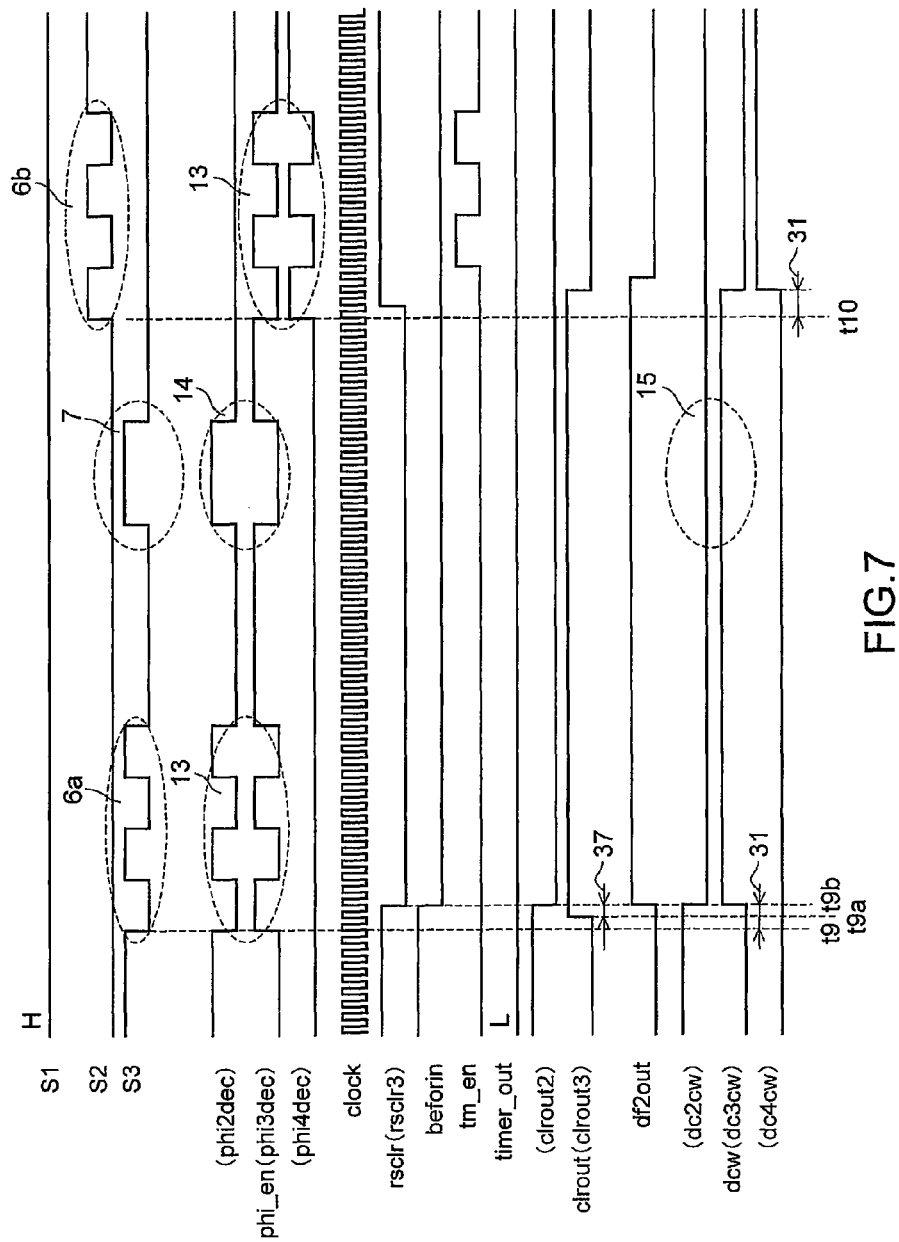
FIG. 7 is a waveform chart illustrating removal of chattering according to the first embodiment.

FIG. 7 is a waveform chart illustrating removal of chattering according to the first embodiment. FIG. 7 enlarges and shows times around the times t9 to t10 of FIG. 4 and mainly illustrates the signal of each unit of the third one-sixth angle determining unit 111-3.

As shown in FIG. 7, at the time t9, the third sensor signal S3 attains "L", but a chattering 6a occurs in the third sensor signal S3 thereafter. Accordingly, at the time t9, a chattering 13 also occurs in the third rotational position signal phi3dec that attained "H" level (i.e., signal phi_en of the third one-sixth angle determining unit 111-3).

At the time t9, the signal beforin is at "H" level (the second clearing signal clrout2 of the second one-sixth angle determining unit 111-2 in the previous stage is at "H" level), and therefore, the third rotational position memory determining unit 122 of the third one-sixth angle determining unit 111-3 immediately accepts rise of the third rotational position signal phi3dec (signal phi_en), and at the time t9a, the signal clrout attains "H" level (third clearing signal clrout3 attains "H" level). Accordingly, in response to a subsequent pulse of the clock signal clock, the signal df2out attains "H" level and the signal dcw attains "H" level (the third motor control signal dc3cw attains "H" level) at the time t9b. In other words, the third motor control signal dc3cw attains "H" level after the delay 31 since the time t9.

When the signal clrout attains "H" level (the third clearing signal clrout3 attains "H" level) at the time t9a, the determination clearing unit 110 changes the signals as follows. At the time t9b subsequent thereto, the signal rsclr attains "L" level (the third rotational position clearing signal rsclr3 attains "L" level) and the second rotational position clearing signal rsclr2 attains "H" level (see FIG. 4). For this reason, the second one-sixth angle determining unit 111-2 is cleared at the time t9b, and the second clearing signal clrout2 attains "L" level. That is, after a period 37 since the signal clrout attains "H" level (the third clearing signal clrout3 attains "H" level), the second clearing signal clrout2 attains "L" level. As described above, if the signal clrout (third clearing signal clrout3) is output as the signal dcw (third motor control signal dc3cw) as it is, this makes the period 37 in which the "H" period overlaps the signal clrout (second clearing signal clrout2) of the second one-sixth angle determining unit 111-2 of the previous stage. The D flip-flop 124 and the AND circuit 125 are circuits for timing adjustment of the signal dcw for avoiding the period 37.

Subsequently, operation for removing the noise will be explained in detail.

Figure 8:
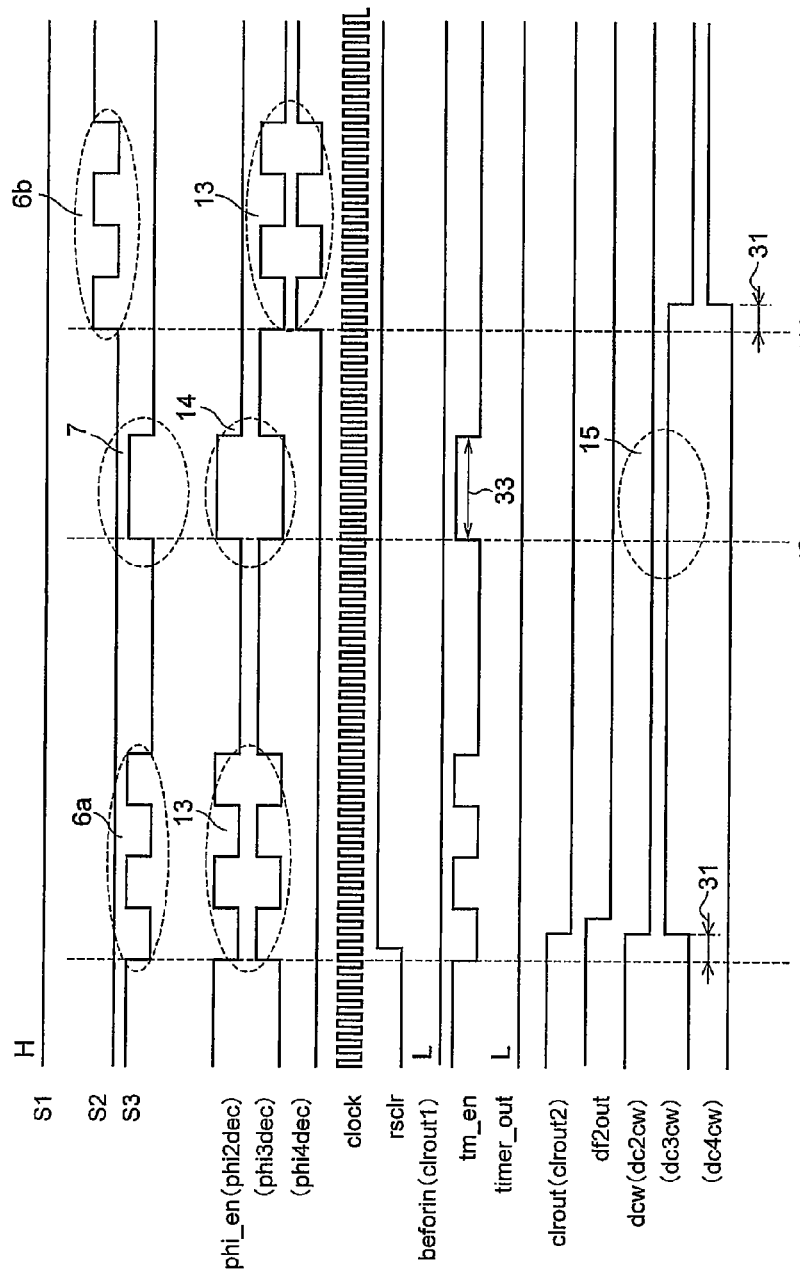
FIG. 8 is a waveform chart illustrating removal of noise according to the first embodiment.

FIG. 8 is a waveform chart illustrating removal of noise according to the first embodiment. FIG. 8 enlarges and shows times around the times t9 to t10 of FIG. 4 and mainly illustrates the signal of each unit of the second one-sixth angle determining unit 111-2.

As shown in FIG. 8, and as described above, after the chattering 6a from the time t9 converges, the third sensor signal S3 maintains "L" level, but thereafter the third sensor signal S3 attains "H" level at the time t9c. That is, from the time t9c, a noise 7 occurs in the third sensor signal S3. Accordingly, the second rotational position signal phi2dec (i.e., the signal phi_en of the second one-sixth angle determining unit 111-2) also attains "H" level at the time t9c (noise 14).

Due to the noise 14, at the time t9c, the signal beforin is at "L" level (the first clearing signal clrout1 is at "L" level) and the signal phi_en is at "H" level (the second rotational position signal phi2dec is at "H" level) in the second one-sixth angle determining unit 111-2. Accordingly, in the second one-sixth angle determining unit 111-2, the second timer enable signal tm_en attains "H" level, and this starts the timer of the second non-match timer unit 121. However, a period 33 in which the second timer enable signal tm_en is at "H" level (i.e., period in which the noise 7 is generated) is shorter than the setting time of the second non-match timer unit 121, and before the second timer output signal timer_out attains "H" level, the second timer enable signal tm_en attains "L" level. For this reason, the noise 7 is disregarded, and the signal clrout continues to be at "L" level (the second clearing signal clrout2 continues to be at "L" level), which is the same as the level before the time t9c. Therefore, the first to sixth motor control signals dc1cw to dc6cw are not affected by the noise 7 (state 15).

It should be noted that the setting times of the first to seventh non-match timer units 121 may be determined appropriately through experiment and simulation so that the noise can be disregarded.

As described above, the timer units (the seven non-match timer units, i.e., the first to seventh non-match timer unit 121, of the rotational position determining unit 105) measure the times in the first period in which the first to seventh rotational position signals phi1dec to phi6dec, phi78dec represent a certain rotational position other than the subsequent rotational position of the stored current rotational position. Then, when the timer unit measures the time up to the setting time in the first period, the rotational position determining unit 105 generates the first to sixth motor control signals dc1cw to dc6cw representing the rotational position represented in the first period.

Subsequently, operation in the state in which the current rotational position is not stored at the start-up or re-start of the motor will be explained in detail.

Figure 9:
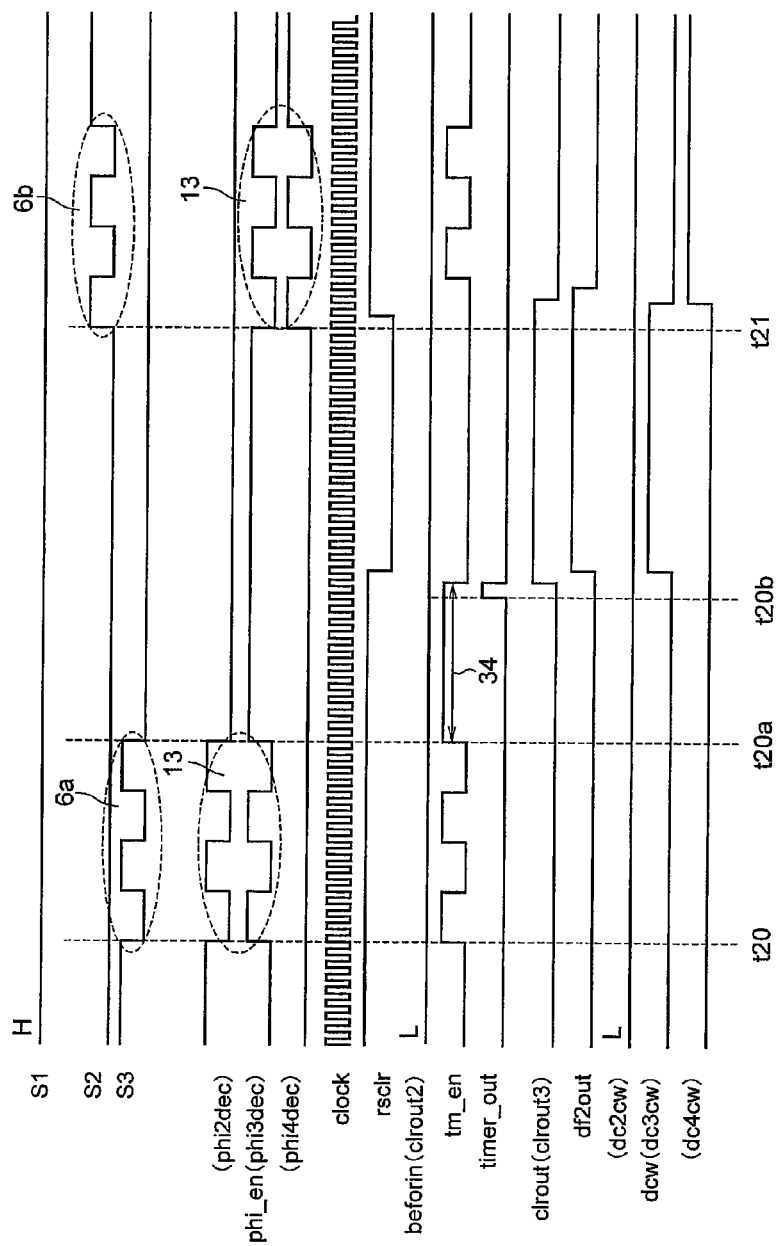
FIG. 9 is a waveform chart illustrating operation at, e.g., the start-up of the motor according to the first embodiment.

FIG. 9 is a waveform chart illustrating operation at, e.g., the start-up of the motor according to the first embodiment. FIG. 9 mainly illustrates the signal of each unit of mainly the third one-sixth angle determining unit 111-3. FIG. 9 illustrates a state different from FIG. 4. In FIG. 9, before the time t20, the all of the first to sixth motor control signals dc1cw to dc6cw and the first to sixth clearing signals clrout1 to clrout6 are at "L" level, i.e., the current rotational position is not stored.

Due to the chattering 6a of the third sensor signal S3 starting from the time t20, a chattering 13 is also occurs in the third rotational position signal phi3dec. However, in the third one-sixth angle determining unit 111-3, the signal beforin is at "L" level (the second clearing signal clrout2 is at "L" level), and therefore, change of the third rotational position signal phi3dec is disregarded, and the signal dcw (third motor control signal dc3cw) is maintained at "L" level and is not changed. After the chattering 6a converges, the signal phi_en continues to be at "H" level (the third rotational position signal phi3dec continues to be at "H" level) after the time t20a. Accordingly, the third timer enable signal tm_en continues to be at "H" level throughout the period 34. Therefore, at the time t20b, the third non-match timer unit 121 measures the time up to the setting time, and the third timer output signal timer_out attains "H" level. Accordingly, after the signal clrout attains "H" level (the third clearing signal clrout3 attains "H" level), the signal dcw (the third motor control signal dc3cw) also attains "H" level.

After the time t21, according to the normal operation explained above, the control proceeds in a loop manner, for example, in the following order: the fourth one-sixth angle determining unit 111-4, the fifth one-sixth angle determining unit 111-5, the sixth one-sixth angle determining unit 111-6, and the first one-sixth angle determining unit 111-1.

As described above, when the current rotational position is not stored, the timer unit measures the time in the second period in which the first to seventh rotational position signals phi1dec to phi6dec, phi78dec represent a certain rotational position. Then, when the timer unit measures the time up to the setting time in the second period, the rotational position determining unit 105 generates the first to sixth motor control signals dc1cw to dc6cw representing the rotational position represented in the second period.

Subsequently, operation in the abnormal state, in which the combination of the first to third sensor signals S1 to S3 that never happens during normal rotation occurs, will be explained.

Figure 10:
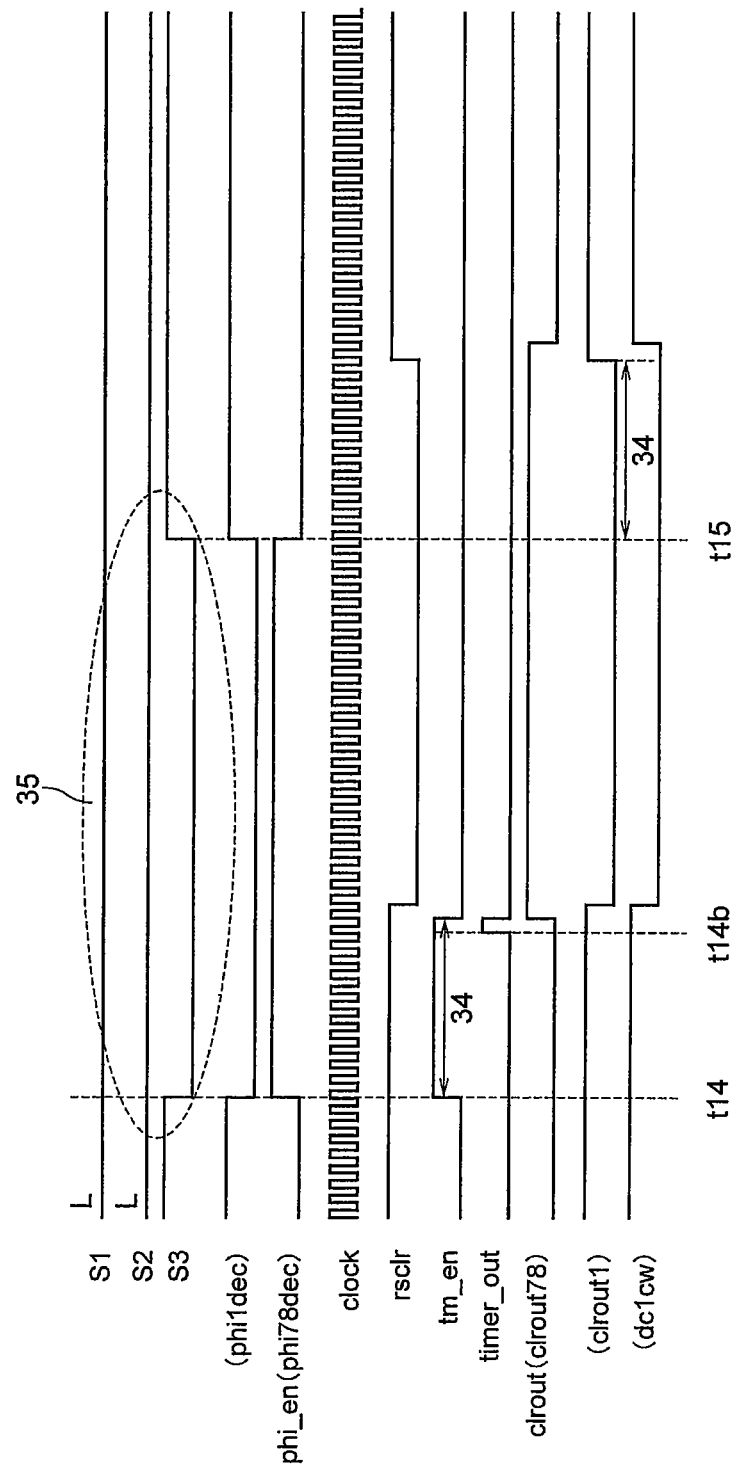
FIG. 10 is a waveform chart illustrating operation in the abnormal state according to the first embodiment.

FIG. 10 is a waveform chart illustrating operation in the abnormal state according to the first embodiment. FIG. 10 enlarges and shows times around the times t14 to t15 of FIG. 4 and mainly illustrates the signal of each unit of the rotational position abnormality determining unit 112.

From the times t14 to t15, the third sensor signal S3 attains "L" level due to a reason other than the noise, and as a result, a state 35 is attained in which all of the first to third sensor signals S1 to S3 are at "L" level, which never happens during the normal rotation. Accordingly, from the times t14 to t15, the seventh rotational position signal phi78dec attains "H" level. Therefore, the seventh prediction non-match detection unit 120' of the rotational position abnormality determining unit 112 is configured such that since the signal of its own clrout is at "L" level and the signal phi_en is at "H" level (i.e., the seventh rotational position signal phi78dec is at "H" level), the seventh timer enable signal tm_en attains "H" level at the time t14, and this starts the timer of the seventh non-match timer unit 121. The seventh timer enable signal tm_en continues to be at "H" level in the period 34. Therefore, at the time t14b, the seventh non-match timer unit 121 measures the time up to the setting time, and the seventh timer output signal timer_out attains "H" level. Accordingly, since the signal clrout attains "H" level (the seventh clearing signal clrout78 attains "H" level), the determination clearing unit 110 causes the first to sixth rotational position clearing signals rsclr1 to rsclr6 for clearing the first to sixth one-sixth angle determining units 111-1 to 111-6 to attain "H" level (see FIG. 4). Therefore, all of the first to sixth motor control signals dc1cw to dc6cw and the first to sixth clearing signals clrout1 to clrout6 attain "L" level (see FIG. 4).

Thereafter, when the first to third sensor signals S1 to S3 return back to normal at the time t15, normal rotation operation is recovered upon the operation in the state in which the current rotational position is not stored at the start-up or re-start of the motor explained above.

As FIG. 4 shows, after the time t15, the second sensor signal S2 attains "H" level due to a reason other than the noise, and as a result, a state 36 is attained in which all of the first to third sensor signals S1 to S3 are at "H" level, which never happens during the normal rotation. Accordingly, the seventh rotational position signal phi78dec attains "H" level. The operation subsequent thereto is the same as the operation in the state 35 explained above.

As described above, the timer unit measures the time in the third period in which the first to seventh rotational position signals phi1dec to phi6dec, phi78dec represent abnormality. Then, when the timer unit measures the time up to the setting time in the third period, the rotational position determining unit 105 generates the first to sixth motor control signals dc1cw to dc6cw, all of which are at "L" level, representing the abnormality.

According to the above control, when the first to third sensor signals S1 to S3 continue to be in the abnormal state for setting time, all of the first to sixth motor control signals dc1cw to dc6cw attain "L" level, and therefore, this can prevent flow of abnormal current through the motor 100 and prevent abnormal rotation of the motor 100.

As explained above, according to the present embodiment, the current rotational position of the motor 100 is stored, and when the first to seventh rotational position signals phi1dec to phi6dec, phi78dec represent the subsequent rotational position (predicted rotational position) of the stored current rotational position, the stored current rotational position is updated with the subsequent rotational position, and the first to sixth motor control signals dc1cw to dc6cw representing the subsequent rotational position are generated. Therefore, when the rotational position of the motor 100 is at the subsequent rotational position of the current rotational position, i.e., the predicted correct rotational position, the first to sixth motor control signals dc1cw to dc6cw representing the subsequent rotational position can be immediately generated while the chattering 6 of the first to third sensor signals S1 to S3 is disregarded. Therefore, the motor 100 is less likely to be affected by the chattering 6, and moreover the delay 31 can be reduced. Because the delay 31 can be reduced, even when the rotational speed of the motor 100 is high, the motor drive signal generating unit 106 can reliably perform the signal processing.

The time is measured in the first period in which the first to seventh rotational position signals phi1dec to phi6dec, phi78dec represent a certain rotational position other than the subsequent rotational position, and when the time is measured up to the setting time, the first to sixth motor control signals dc1cw to dc6cw representing the rotational position are generated. Therefore, when the noise 7 occurring in a period equal to or less than the setting time is applied to the first to third sensor signals S1 to S3, the time is not measured up to the setting time, and therefore, the first to sixth motor control signals dc1cw to dc6cw corresponding to this noise 7 are not generated. In other words, such noise is disregarded, and therefore, it is less likely to be affected by the noise. Even when the setting time is increased, the length of the delay 31 is not affected. Therefore, large noise (i.e., noise occurs for a long time) can be removed while the delay is maintained at a low level.

According to the above, the motor 100 can be smoothly rotated while the motor 100 is less likely to be affected by the noise and chattering.

Second Embodiment

In the present embodiment, a current position storage unit and a non-match timer unit are provided.

Figure 11:
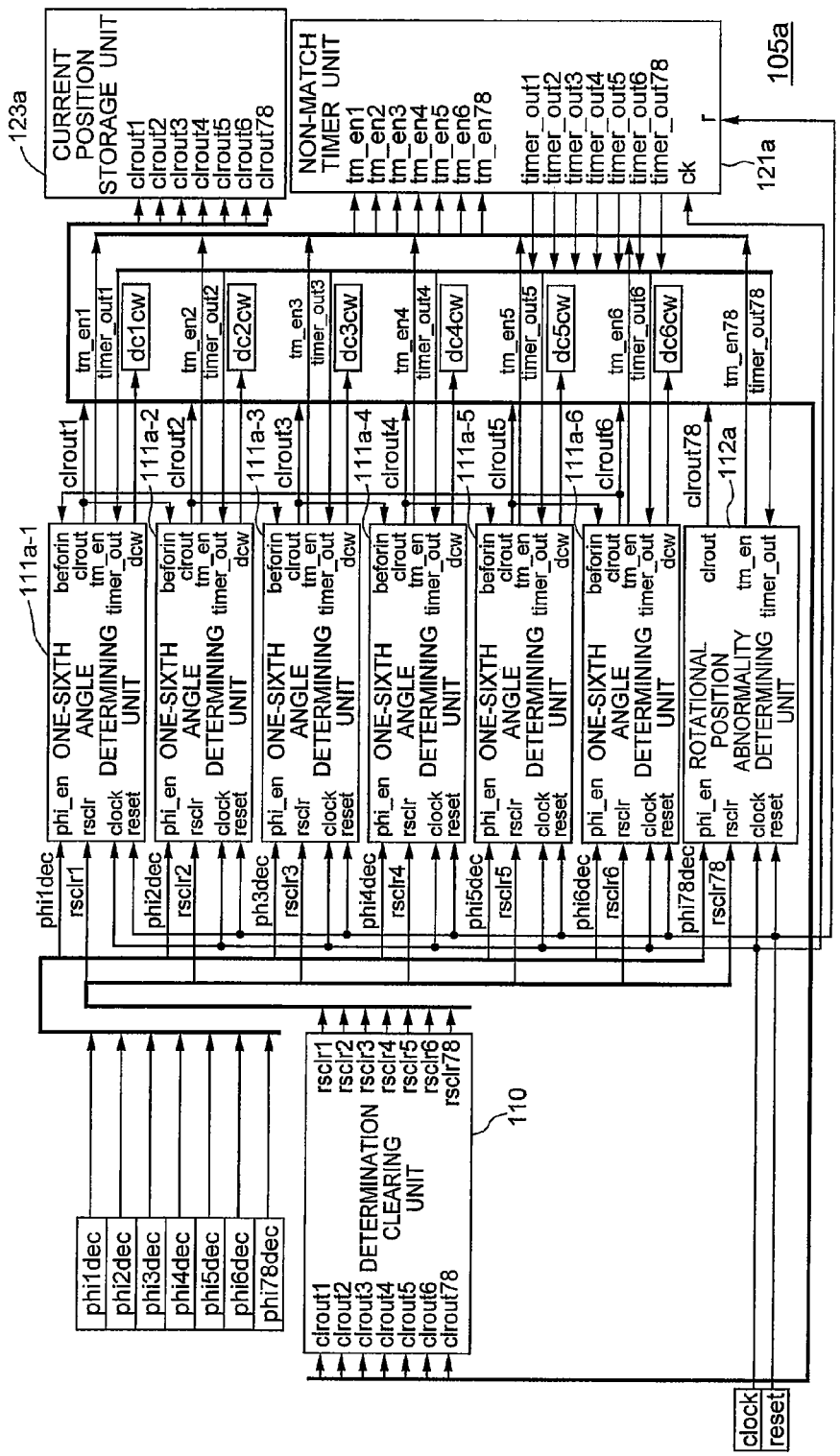
FIG. 11 is a block diagram illustrating a configuration of a rotational position determining unit according to a second embodiment.
Figure 12:
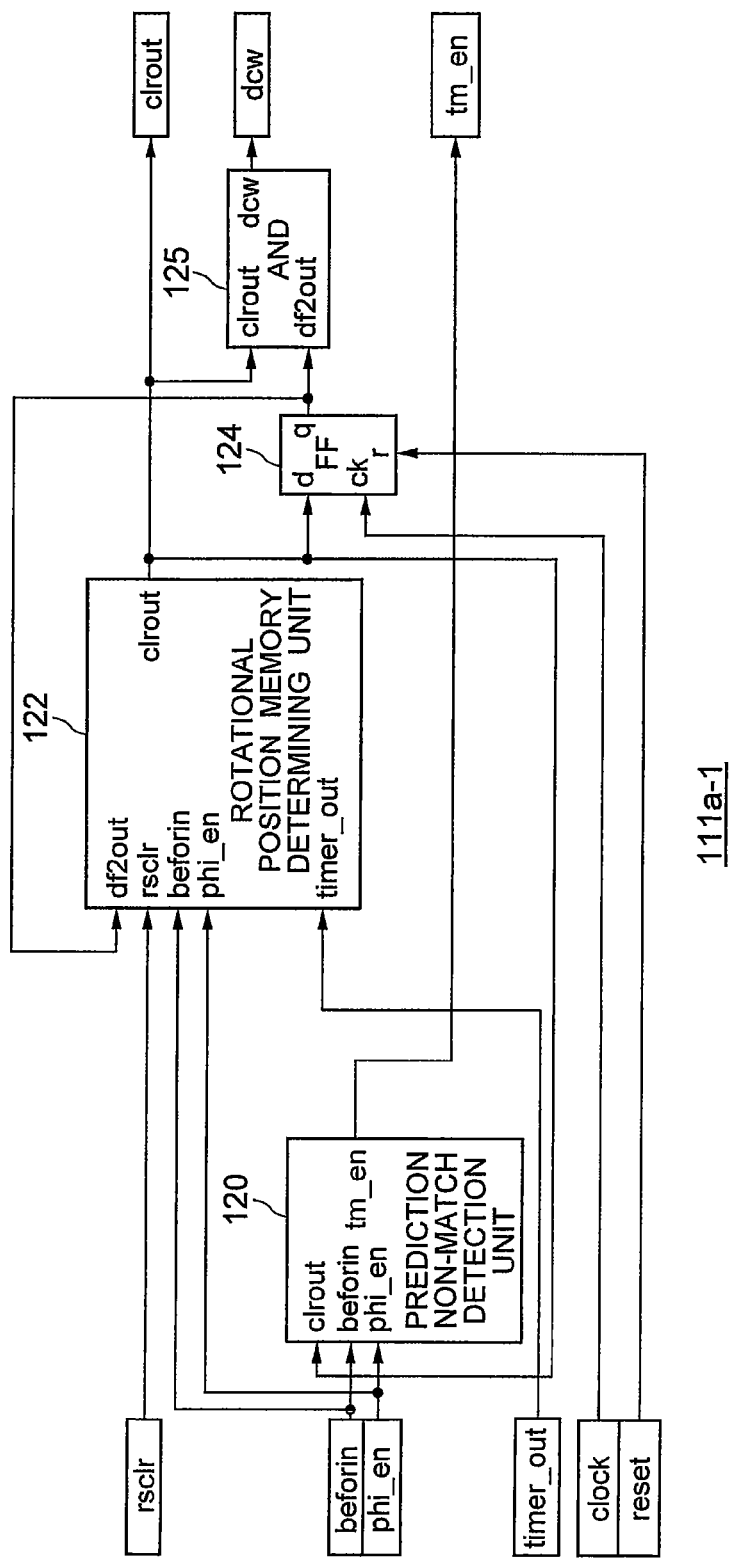
FIG. 12 is a block diagram illustrating a configuration of a first one-sixth angle determining unit according to the second embodiment.
Figure 13:
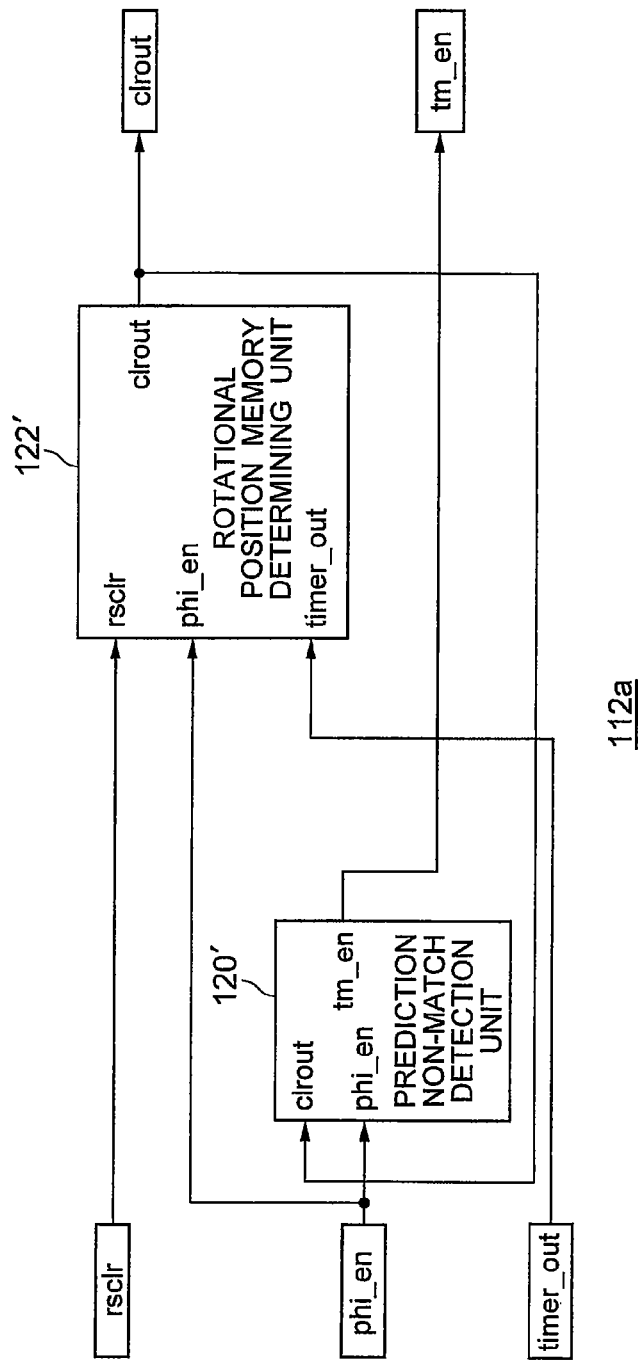
FIG. 13 is a block diagram illustrating a configuration of a rotational position abnormality determining unit according to the second embodiment.

FIG. 11 is a block diagram illustrating a configuration of a rotational position determining unit 105a according to the second embodiment. FIG. 12 is a block diagram illustrating a configuration of a first one-sixth angle determining unit 111a-1 according to the second embodiment. FIG. 13 is a block diagram illustrating a configuration of a rotational position abnormality determining unit 112a according to the second embodiment.

As shown in FIG. 11, the rotational position determining unit 105a includes a determination clearing unit 110, first to sixth one-sixth angle determining units 111a-1 to 111a-6, a rotational position abnormality determining unit 112a, a non-match timer unit 121a, and a current position storage unit 123a. The same constituent elements as those of the first embodiment are denoted with the same reference numerals, and description thereabout is omitted. Only portions different from the first embodiment will be hereinafter explained.

As shown in FIG. 12, the first one-sixth angle determining unit 111a-1 has a configuration in which the first current position storage unit 123 and the first non-match timer unit 121 are removed from the first one-sixth angle determining unit 111-1 according to the first embodiment. In other words, a timer enable signal tm_en (first timer enable signal tm_en1) from the first prediction non-match detection unit 120 is output from the first one-sixth angle determining unit 111a-1. The timer output signal timer_out (first timer output signal timer_out1) input to the first one-sixth angle determining unit 111a-1 is supplied to the first rotational position memory determining unit 122. The second to sixth one-sixth angle determining units 111a-2 to 111a-6 have the same configuration as the first one-sixth angle determining unit 111a-1.

Likewise, as shown in FIG. 13, the rotational position abnormality determining unit 112a has a configuration in which the seventh current position storage unit 123 and the seventh non-match timer unit 121 are removed from the rotational position abnormality determining unit 112 according to the first embodiment.

As shown in FIG. 11, the first to seventh clearing signals clrout1 to clrout6, clrout78 are also supplied to the current position storage unit 123a. The current position storage unit 123a includes, for example, a three-bit register to store which of the first to seventh clearing signals clrout1 to clrout6, clrout 78 is at "H" level.

The first to sixth one-sixth angle determining units 111a-1 to 111a-6 and the rotational position abnormality determining unit 112a respectively output the first to seventh timer enable signals tm_en1 to tm_en6, tm_en78, and these signals are supplied to the non-match timer unit 121a. The non-match timer unit 121a outputs the first to seventh timer output signals timer_out1 to timer_out6, timer_out78, and each of the signals is supplied to the corresponding first to sixth one-sixth angle determining units 111a-1 to 111a-6 and the rotational position abnormality determining unit 112a. The non-match timer unit 121a includes one timer, and starts measuring the time when any one of the first to seventh timer enable signals tm_en1 to tm_en6, tm_en78 attains "H" level. Then, like the first embodiment, when the time is measured up to the setting time, any one of the first to seventh timer output signals timer_out1 to timer_out6, timer_out78 is changed to "H"

level according to one of the first to seventh timer enable signals tm_en1 to tm_en6, tm_en78 at "H" level.

As described above, according to the present embodiment, the first to sixth one-sixth angle determining units 111a-1 to 111a-6 and the rotational position abnormality determining unit 112a share the current position storage unit 123a and the non-match timer unit 121a. Therefore, the circuit size can be reduced as compared with the first embodiment.

In addition, the same effects as those of the first embodiment can be obtained.

According to each embodiment explained above, the motor 100 can be smoothly rotated.

Comparative Example

Now, a motor control system according to a comparative example known to the inventors will be explained while it is compared with the motor control system according to the first and second embodiment explained above.

Figure 14:
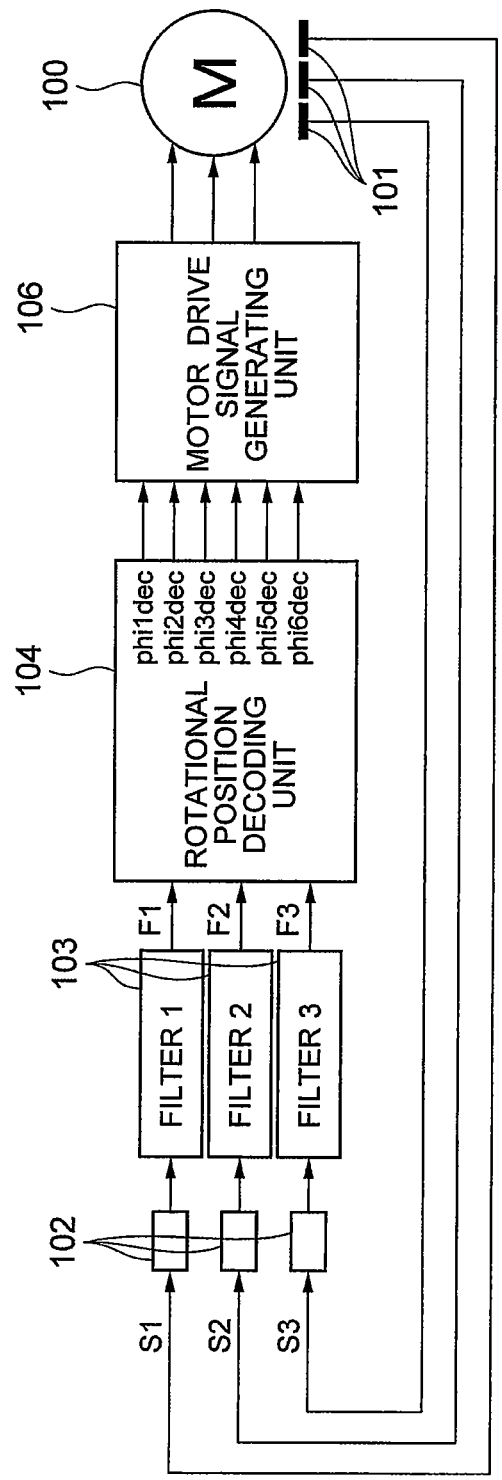
FIG. 14 is a block diagram schematically illustrating a configuration of a motor control system according to a comparative example.

FIG. 14 is a block diagram schematically illustrating a configuration of a motor control system according to a comparative example. As shown in FIG. 14, the motor control system includes a motor 100, three sensors 101, three filters 103, a rotational position decoding unit 104, and a motor drive signal generating unit 106. In other words, the motor control system is obtained by removing the rotational position determining unit 105 from the motor control system according to the first and second embodiments and adding the filter 103 thereto.

The filter 103 is, for example, an analog filter, which removes chattering and noise from the corresponding sensor signals S1 to S3, and supplies the corresponding filter output signals F1 to F3 to the rotational position decoding unit 104.

Figure 15:
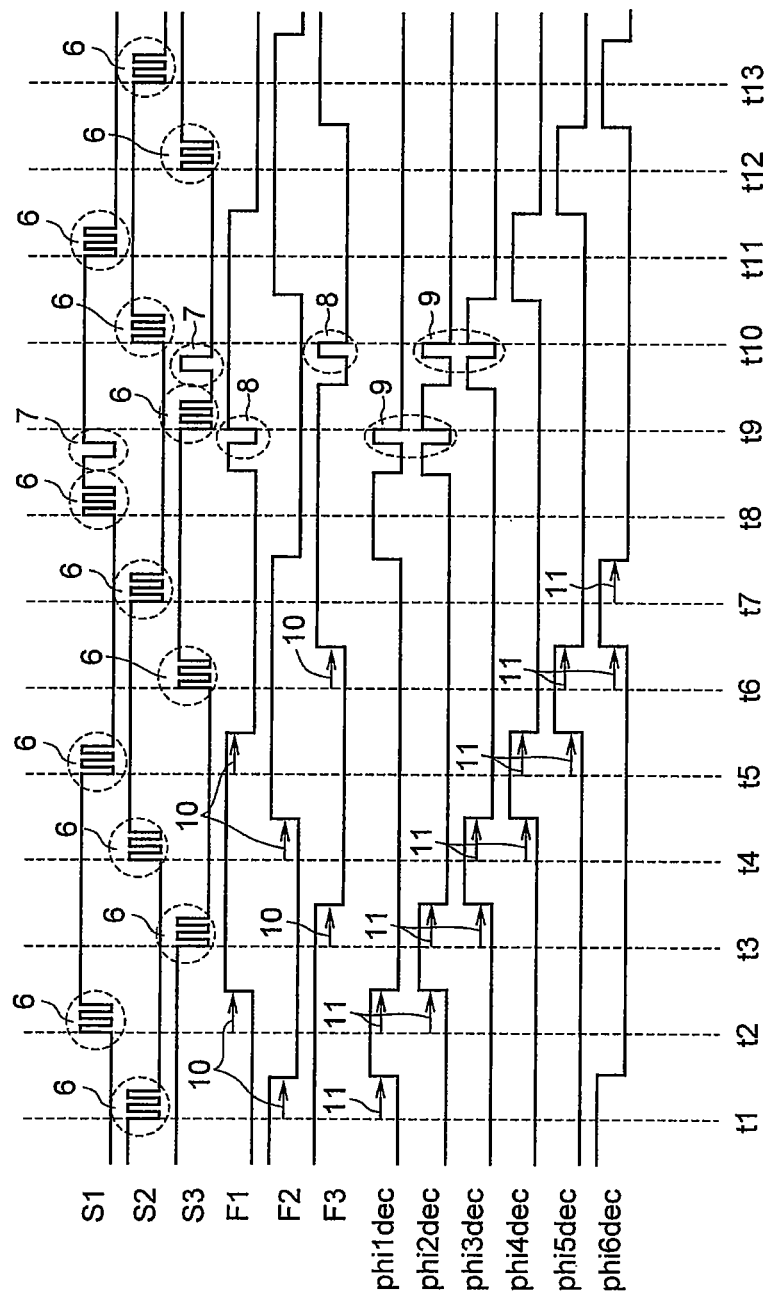
FIG. 15 is a waveform chart illustrating signals of the motor control system according to the comparative example.

FIG. 15 is a waveform chart illustrating signals of the motor control system according to the comparative example. FIG. 15 corresponds to the waveform chart according to the first embodiment of FIG. 2. That is, the sensor signals S1 to S3 are the same as those as shown in FIG. 2.

The chattering 6 of the sensor signals S1 to S3 is removed by the filter 103. Therefore, the filter output signals F1 to F3 do not involve any chattering but involves a delay 10. For example, at a time t2, the sensor signal S1 attains "H" level, but the filter output signal F1 attains "H" level after the delay 10 since the time t2. Accordingly, the rotational position signals phi1dec to phi6dec also has a delay 11 equivalent to the delay 10. For example, the delay 11 is about 100 μs.

However, the noise 7 generated in the sensor signals S1 and S3 cannot be removed by the filter 103, and is transmitted as a noise 8 to the filter output signals F1 and F3. Then, the noise 8 is transmitted as a noise 9 to the rotational position signals phi1dec to phi3dec.

As described above, the comparative example is different from the first and second embodiments in that when large noise 7 (i.e., noise occurs for a long time) occurs that cannot be removed by the filter 103 as shown in FIG. 15, the noise 9 is included in the rotational position signals phi1dec to phi6dec, i.e. the motor drive signals. This may cause an abnormal current to flow through the motor 100 and may cause the motor to abnormally rotate, thereby disturbing smooth rotation of the motor. On the other hand, when the filter 103 capable of removing such large noise is used, the delay 11 increases, which makes it difficult for the motor drive signal generating unit 106 to perform the signal processing according to the rotation of the motor 100.

In contrast, according to the present embodiment, the delay 31 can be improved by, for example, several microseconds upon removing the noise.

Modification

In the above explanation, the motor control circuit and the motor control system using the three-phase motor has been explained. However, the embodiments are not limited thereto. Each embodiment can also be applied to a motor other than three-phase motor such as a four-phase motor.

The number of the sensors 101 and the number of the rotational position signals and motor drive signals are not limited to those in the above example in the embodiments explained above.

The high level and the low level explained above may be oppositely arranged.

At least a portion of the motor control circuit described in the above embodiments may be constituted by hardware or software. In the software configuration, a program realizing at least a portion of the functions of the motor control circuit is stored in a recording medium such as a flexible disk or a CD-ROM and may be read by a computer to be executed thereby. The storage medium is not limited to a detachable one such as a magnetic disk and an optical disk and may be a stationary recording medium such as a hard disk device and a memory.

Furthermore, the program realizing at least a portion of the motor control circuit may be distributed through a communication line (including wireless communication) such as the Internet. While the program is encrypted, modulated, or compressed, the program may be distributed through a wired line or a wireless line such as the Internet, or the program stored in a recording medium may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A motor control circuit configured to control a motor according to a rotational position of the motor detected by a sensor, the motor control unit comprising:
   a rotational position decoding unit configured to generate a rotational position signal representing one of multiple expected rotational positions of the motor according to a sensor signal provided by the sensor;
   a rotational position determining unit configured to a store a current expected rotational position of the motor corresponding to the rotational position signal and to generate a motor control signal corresponding to the stored expected rotational position, wherein when the rotational position decoding unit generates a rotational position signal representing a subsequent expected rotational position of the motor, the rotational position determining unit updates the stored expected rotational position with the subsequent expected rotational position, and generates a motor control signal based on the stored expected rotational position as updated; and a motor drive signal generating unit configured to generate a motor drive signal for driving the motor according to the motor control signal, wherein the rotational position determining unit comprises a timer unit configured to measure a time in a first period in which the rotational position signal represents a certain rotational position other than the subsequent expected rotational position of the stored current expected rotational position, when the current expected rotational position is not stored at the start-up or re-start of the motor, the timer unit measures the time in a second period in which the rotational position signal represents a certain rotational position, when the timer unit measures, in the first period, the time up to a predetermined setting time, the rotational position determining unit updates the stored expected rotational position with the rotational position represented in the first period and generates the motor control signal based on the rotational position represented in the first period, when the timer unit measures the time up to the predetermined setting time in the second period, the rotational position determining unit stores the rotational position represented in the second period as the current expected rotational position and generates the motor control signal based on the rotational position represented in the second period.

2. The motor control circuit according to claim 1, wherein when the sensor signal is abnormal, the rotational position decoding unit generates the rotational position signal representing the abnormality, the timer unit measures the time in a third period in which the rotational position signal represents the abnormality, and when the timer unit measures the time up to the setting time in the third period, the rotational position determining unit generates the motor control signal representing the abnormality.

3. The motor control circuit according to claim 2, wherein the motor is a three-phase brushless motor.

4. The motor control circuit according to claim 3, wherein the sensor signal supplied from the sensor comprises first to third sensor signals, the rotational position decoding unit generates first to seventh rotational position signals as the expected rotational position signal, only one of the first to sixth rotational position signals is enabled every 60 degrees of rotational position of the motor, when the first to third sensor signals are abnormal, only the seventh rotational position signal is enabled, and the rotational position determining unit generates first to sixth motor control signals as the motor control signal.

5. The motor control circuit according to claim 4, wherein when the first to third sensor signals are abnormal, all the first to third sensor signals are either enabled or disabled.

6. The motor control circuit according to claim 4, wherein the rotational position determining unit comprises:

a determination clearing unit configured such that when any one of the first to sixth clearing signals is enabled, one of the first to seventh rotational position clearing signals corresponding to the enabled clearing signal is disabled, and the other rotational position clearing signals are enabled, and when the seventh clearing signal is enabled, the corresponding seventh rotational position clearing signal is disabled and the first to sixth rotational position clearing signals are enabled;

first to sixth one-sixth angle determining units; and a rotational position abnormality determining unit configured to make the seventh clearing signal enabled when the seventh rotational position signal continues to be enabled for the setting time, wherein where the first rotational position signal is enabled when the sixth clearing signal is enabled, the first one-sixth angle determining unit enables the first clearing signal and the first motor control signal, and when the first rotational position clearing signal is enabled, the first one-sixth angle determining unit disables the first clearing signal and the first motor control signal, and where the k-th (k is an integer from 2 to 6) rotational position signal is enabled when the (k−1)th clearing signal is enabled, the k-th one-sixth angle determining unit enables the k-th clearing signal and the k-th motor control signal, and when the k-th rotational position clearing signal is enabled, the k-th one-sixth angle determining unit disables the k-th clearing signal and the k-th motor control signal.

7. The motor control circuit according to claim 6, wherein the rotational position determining unit further comprises:

a non-match timer unit serving as the timer unit, configured to count up when one of the first to seventh timer enable signals is enabled, and when the non-match timer unit measures the time up to the setting time, the non-match timer unit enables one of the first to seventh timer output signals according to the enabled timer enable signal; and a current position storage unit configured to store which one of the first to seventh clearing signals is enabled, wherein the first one-sixth angle determining unit comprises:

a first prediction non-match detection unit configured to enable the first timer enable signal, when the first clearing signal and the sixth clearing signal are disabled and the first rotational position signal is enabled; and a first rotational position memory determining unit configured to enable the first clearing signal and the first motor control signal, when the first timer output signal is enabled or when the sixth clearing signal and the first rotational position signal are enabled, wherein the k-th (k is an integer from 2 to 6) one-sixth angle determining unit comprises:

a k-th prediction non-match detection unit configured to enable the k-th timer enable signal when the k-th clearing signal and the (k−1)th clearing signal are disabled and the k-th rotational position signal is enabled; and a k-th rotational position memory determining unit configured to enable the k-th clearing signal and the k-th motor control signal, when the k-th timer output signal is enabled or when the (k−1)th clearing signal and the k-th rotational position signal are enabled.

8. The motor control circuit according to claim 6, wherein when the current expected rotational position is not stored, the first to sixth motor control signals and the first to sixth clearing signals are disabled.

9. The motor control circuit according to claim 6, wherein the first one-sixth angle determining unit comprises:

a first prediction non-match detection unit configured to enable a first timer enable signal, when the first clearing signal and the sixth clearing signal are disabled and the first rotational position signal is enabled;

a first non-match timer unit serving as the timer unit, configured to count up when the first timer enable signal is enabled, and when the first non-match timer unit measures the time up to the setting time, the first non-match timer unit enables the first timer output signal;

a first rotational position memory determining unit configured to enable the first clearing signal and the first motor control signal, when the first timer output signal is enabled or when the sixth clearing signal and the first rotational position signal are enabled; and a first current position storage unit configured to store the first clearing signal, wherein the k-th (k is an integer from 2 to 6) one-sixth angle determining unit comprises:

a k-th prediction non-match detection unit configured to enable the k-th timer enable signal when the k-th clearing signal and the (k−1)th clearing signal are disabled and the k-th rotational position signal is enabled;

a k-th non-match timer unit serving as the timer unit, configured to count up when the k-th timer enable signal is enabled, and when the k-th non-match timer unit measures the time up to the setting time, the k-th non-match timer unit enables the k-th timer output signal;

a k-th rotational position memory determining unit configured to enable the k-th clearing signal and the k-th motor control signal, when the k-th timer output signal is enabled or when the (k−1)th clearing signal and the k-th rotational position signal are enabled; and a k-th current position storage unit configured to store the k-th clearing signal.

10. The motor control circuit according to claim 9, wherein each of the first to sixth non-match timer units clears a counter value when a corresponding timer enable signal is disabled.

11. The motor control circuit according to claim 9, wherein the rotational position abnormality determining unit comprises:

a seventh prediction non-match detection unit configured to enable a seventh timer enable signal, when the seventh clearing signal is disabled and the seventh rotational position signal is enabled;

a seventh non-match timer unit serving as the timer unit, configured to count up when the seventh timer enable signal is enabled, and when the seventh non-match timer unit measures the time up to the setting time, the seventh non-match timer unit enables the seventh timer output signal;

a seventh rotational position memory determining unit configured to enable the seventh clearing signal, when the seventh timer output signal is enabled; and a seventh current position storage unit configured to store the seventh clearing signal.

12. A motor control method for controlling a motor according to a rotational position of the motor detected by a sensor, the motor control method comprising:

generating a rotational position signal representing one of multiple expected rotational positions of the motor according to a sensor signal provided by the sensor;

storing a current expected rotational position of the motor corresponding to the rotational position signal;

generating a motor control signal corresponding to the stored expected rotational position, wherein when the generated rotational position signal represents a subsequent expected rotational position of the motor, the stored expected rotational position is updated with the subsequent expected rotational position, and the motor control signal is generated based on the stored expected rotational control signal as updated; and generating a motor drive signal for driving the motor according to the motor control signal, wherein a timer unit measures a time in a first period in which the rotational position signal represents a certain rotational position other than the subsequent expected rotational position, when the current expected rotational position is not stored at the start-up or re-start of the motor, the timer unit measures the time in a second period in which the rotational position signal represents a certain rotational position, when the timer unit measures, in the first period, the time up to a predetermined setting time, the stored expected rotational position is updated with a rotational position represented in the first period and the motor control signal representing the rotational position represented in the first period is generated, and when the timer unit measures the time up to the predetermined setting time in the second period, the rotational position represented in the second period is stored as the current expected rotational position and the motor control signal representing the rotational position represented in the second period is generated.

* * * * *